United States Patent [19]

Okada

[11] Patent Number: 4,489,349
[45] Date of Patent: Dec. 18, 1984

[54] VIDEO BRIGHTNESS CONTROL CIRCUIT

[75] Inventor: Takashi Okada, Yokohama, Japan

[73] Assignee: Sony Corporation, Tokyo, Japan

[21] Appl. No.: 230,394

[22] Filed: Feb. 2, 1981

[30] Foreign Application Priority Data

Jan. 31, 1980 [JP] Japan .................................. 55-10667

[51] Int. Cl.³ ............................................. H04N 5/68
[52] U.S. Cl. ...................................... 358/168; 358/32; 358/164
[58] Field of Search .................... 358/168, 39, 74, 243, 358/32, 164

[56] References Cited

U.S. PATENT DOCUMENTS

| | | | |
|---|---|---|---|
| 2,255,691 | 9/1941 | Wilson | 358/164 |
| 3,619,496 | 11/1971 | Lichtenstein | 358/168 |
| 3,752,905 | 8/1973 | Schneider | 358/32 |
| 3,873,767 | 3/1975 | Okada | 358/168 |
| 3,980,822 | 9/1976 | Suzuki | 358/168 |
| 4,044,375 | 8/1977 | Norman | 358/168 |
| 4,091,419 | 5/1978 | Rhee | 358/168 |
| 4,298,885 | 11/1981 | Okada | 358/39 |

FOREIGN PATENT DOCUMENTS

| | | | |
|---|---|---|---|
| 2312150 | 1/1977 | France | 358/164 |
| 71604 | 1/1980 | Japan | 358/168 |

Primary Examiner—Tommy P. Chin
Attorney, Agent, or Firm—Lewis H. Eslinger; Alvin Sinderbrand

[57] ABSTRACT

A control circuit for controlling the relative brightness of a video signal includes an average picture level (APL) detector to measure the average brightness of the video signal and a brightness control circuit responsive to the detected average brightness to provide an output video signal wherein the picture areas containing most of the picture information are corrected to give greater contrast. In the output signal, portions corresponding to the black and peak white levels of the incoming video signals are provided substantially at the black and peak white levels, respectively, while the average brightness level of the output video signal is provided at an optimum level, such as 50%. The brightness control circuit can include a variable gamma correction circuit in which the value of gamma is automatically determined by a control signal provided from the APL detector.

21 Claims, 13 Drawing Figures

VIDEO BRIGHTNESS CONTROL CIRCUIT

BACKGROUND OF THE INVENTION

1. Field of the Invention:

This invention relates to video signal processing circuitry and particularly relates to circuitry for controlling the brightness of a video signal so that detail of interest in a video picture will appear natural and have good contrast.

2. Brief Description of the Prior Art:

Natural illumination can have an extremely wide brightness range, and will necessarily have a vast range of contrast scales. The human eye adapts itself remarkably well for viewing naturally-lit objects and can with ease perceive detail in shadows and in brightly lit areas as well. Nevertheless, color video cameras and color video display apparatus are not easily adaptable to conditions of natural illumination, and current videocasting practices require special techniques, such as supplemental fill-in lighting, to provide a pleasing yet natural picture.

However, when such special techniques are unavailable, such as during on-scene news reporting, the picture presented on a display apparatus can be harsh and unpleasant. For example, if an on-the-spot newscast takes place at night with a newscaster at the news scene standing in front of a bright source, such as a flashing neon sign, the picture is likely to be harsh and without good detail. In such a scene, the presentation of the neon light is bright but the other objects in the picture are dark, and the contrast range among such objects is extremely narrow. Thus, except for the neon sign, the picture appears objectionably dim and observation of detail in the picture is difficult.

This problem can be understood by considering that while a color camera can be responsive to input light having an illumination range of from several hundred to several hundred thousand lux, the electrical output of the camera is limited to a range of, for example, 1 volt peak-to-peak. The input light must have a limited illumination range, e.g. 100 to 200 lux or several thousand to several tens of thousands of lux, in order that all of the video output signal remain within the range of 1 volt peak-to-peak. If these illumination limits are not observed, a conventional color television camera and display apparatus will not provide a good, pleasing picture.

Brightness adjustment in the video transmission is now carried out to a limited extent by use of so-called gamma ($\gamma$) correction. This process compensates for the differences in gamma values between the image pickup tube of a television camera and the cathode ray tube (CRT) of a television receiver.

Normally, the picked-up image is gamma-corrected before transmission so that the net gamma value of the image pickup and image display will be unity.

Conventionally, gamma correction is carried out on the image pickup side so that the output signal is skewed logarithmically at the saturated (white) side of the brightness range. Then, the skewed curve is expanded somewhat at the CRT, due to its inherent gamma characteristic, so that the picture brightness is correct.

Generally, if the overall gamma characteristic is logarithmic, the dark picture portions will have expanded contrast, and fine dark or shadow detail is reproduced. Conversely, if the gamma characteristic is exponential, the bright portions will have expanded contrast, and detail in brightly lit areas will be clear.

Further, the lower illumination intensity portions of the video signal are affected by noise in the video apparatus. Consequently, a good video picture cannot be obtained for any scene unless the picture brightness is properly adjusted to span the entire dynamic range of the video apparatus. Accordingly, the actual brightness of an object in the scene does not convert exactly to a particular level of the video output signal, especially if the object is not evenly illuminated. The image of such an object in an unevenly-lit scene is not easily visible when reproduced on a video screen, and hence fatigues the eyes, making viewing somewhat tiring and unpleasant.

OBJECTS AND SUMMARY OF THE INVENTION

Accordingly, it is an object of this invention to provide a technique wherein an image on a video screen is provided with the portion of the picture of most interest having relatively high contrast.

It is a further object of this invention to provide a correction circuit for use, for example, in a color television receiver, which will automatically adjust the brightness of the television signal so that a pleasing picture is presented on the display screen of the receiver, even when the scene is unevenly illuminated.

According to an aspect of this invention, a control circuit for controlling the brightness of a video signal that fluctuates between a peak dark level, such as the black level, and a peak bright level, such as the peak white level, about an average brightness level comprises an average picture level (APL) detector for detecting the average brightness level and, in response, providing a corresponding control signal, and a brightness adjusting circuit for optimizing the brightness of the video signal in response to the control signal, and providing a video output signal in which respective portions of the video output signal corresponding to portions of the incoming video signal at the peak dark level and the peak bright level are provided at the peak dark level and the peak bright level, but in which the average picture level is provided at an optimum level, such as the 50% brightness level.

The brightness adjusting circuit can favorably be formed as an adjustable gamma circuit, in which the value of gamma is determined in accordance with the control signal from the APL detector. In other words, the brightness adjusting circuit has an input-output characteristic such that for a video input signal having a level proportional to a value X, where X is in the range $0 \leq X \leq 1$, the video output signal is provided at a level proportional to a value $X^\gamma$, and the value $\gamma$ is automatically determined in response to the control signal so that the video output signal has an APL at the optimum level.

A correction circuit according to this invention can be incorporated into a color television camera, in which case three brightness adjusting circuits can be included to be operative on respective primary color signals. The circuit of this invention can also be incorporated in a color television receiver. In such case, three brightness adjusting circuits can be provided, each operative upon a separate primary color signal, a single brightness adjusting circuit, operative upon both the chrominance and luminance components of a composite color video signal can be provided, or, alternatively, two brightness adjusting circuits can be provided, one operative upon the luminance component, the other operative upon the chrominance component of a composite color video signal.

Various other features and advantages of the present invention will be apparent from the following description of several preferred embodiments, when considered with the accompanying drawings.

DETAILED DESCRIPTIONN OF SEVERAL PREFERRED EMBODIMENTS

Figure 1:
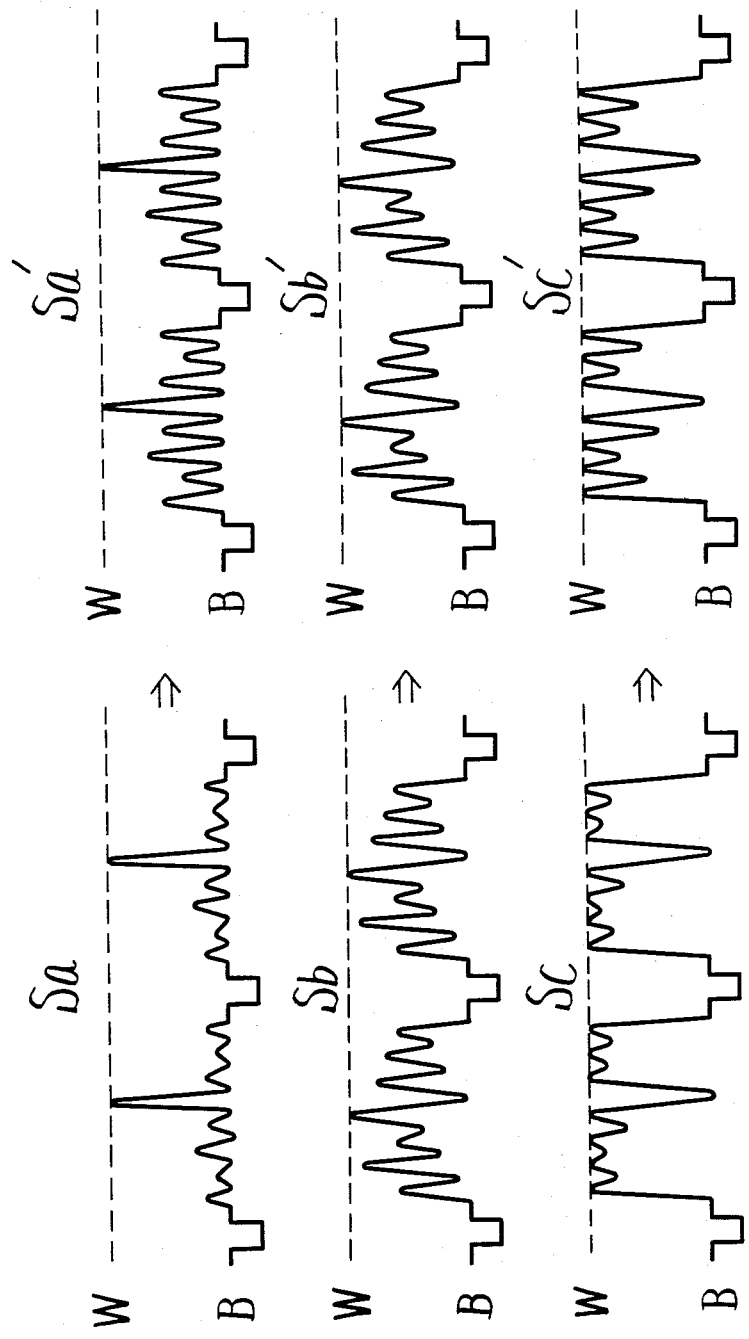
FIG. 1 is a set of charts showing video waveforms before and after treatment in the correction circuit of this invention.

With reference to the drawings, and initially to FIG. 1, typical video signals Sa, Sb, Sc will be considered. In the charts of FIG. 1, the video signals have an amplitude ranging between a black level B and a peak white level W. Each of the video signals Sa, Sb, Sc, has a broad brightness amplitude range extending from black to white.

The signal Sa represents a dimly-lit scene having a single bright portion. In this case, most of the picture detail is in dark tones in the dimly lit portion, and only a small portion of the picture is bright. As a result, the signal-to-noise ratio of the picture is quite low and the signal Sa produces a dirty or hazy picture.

In the signal Sb, bright and dark tones are substantially uniformly distributed, indicating that the televised scene is ideally illuminated. The entire dynamic range of the signal Sb is used effectively so that the signal Sb has a high signal-to-noise ratio, and will produce a fine quality picture.

The signal Sc represents a scene which is brightly lit, but which includes a dark object. Here most of the detail is in bright tones, and the brightness of the picture will cause such detail to become very faint. Signals such as the signal Sc occur rather often when televising scenes out of doors, especially scenes including snow or scenes at a beach.

As aforesaid, the video signals Sa and Sc, although faithfully corresponding to the objects in the respective televised scenes, include detail in the dimly and brightly lit portions, respectively, which will not be easy to see, due to the limited signal-to-noise ratio of the video display apparatus. According to this invention, the video signals Sa and Sc have their brightness levels optimized so that important detail in the picture portions having the largest amount of picture information can be observed with good contrast. Consequently, the image displayed on the video screen will be pleasing and easy to view.

Figure 2:
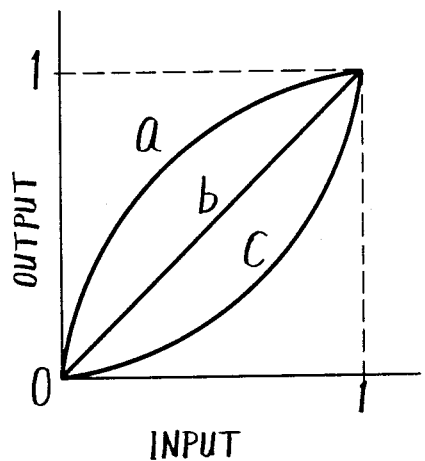
FIG. 2 is an input-output graph for explaining the operation of a portion of the correction circuit of this invention.

In order to achieve this, the video signal is processed through a circuit having an input-output characteristic as shown in FIG. 2.

When the signal Sa is supplied an input, the input-output characteristic is caused to follow curve a of FIG. 2 so that the dimly-lit portions are expanded in contrast while the brightly-lit portions are compressed in contrast, with the result that the processed video signal Sa' is provided as an output video signal.

When the signal Sc is applied as an input, the input-output characteristic thereof follows curve c, so that the brightly-lit portions of the video picture are expanded, while the dimly-lit portions are compressed, so that an output signal Sc' is provided as shown in FIG. 1.

Finally, when the signal Sb is applied as an input, the input-output characteristic becomes a linear function as shown by curve b in FIG. 2, so that the output signal Sb' is provided, and the latter is identical with the input signal Sb.

In order to optimize the output video signals Sa' Sb', and Sc', the input-output characteristic must be changed continuously and automatically according to the information distribution of the input signals Sa, Sb, and Sc. Because the picture information distribution is akin to the proportional amount of bright and dimly-lit portions of the picture, the information distribution can be easily obtained by detecting the average picture level (APL) of the input signals Sa, Sb, and Sc. In other words, when the amount of informationn near the black level B is great, as in the signal Sa, the APL will be low. By contrast, when the amount of information near the peak white level W is great, as in the signal Sc, the APL will be high. Because the Sb has information distributed uniformly between the back B and peak white level W, the signal Sb will have an APL of about 50%.

Accordingly, the input-output characteristic a of FIG. 2 is selected for low APL values, the characteristic c is selected for high APL values, and the linear characteristic b is selected when the APL is at or near its optimum level of 50%. Further, when the APL is at some intermediate level, the input-output characteristic can be selected intermediate the curves a and b or intermediate the curves b and c.

Throughout the following description of various embodiments of this invention, common elements will be identified with the same reference characters, and a description of such elements will be provided only with respect to the embodiment with which they are first introduced.

Figure 3:
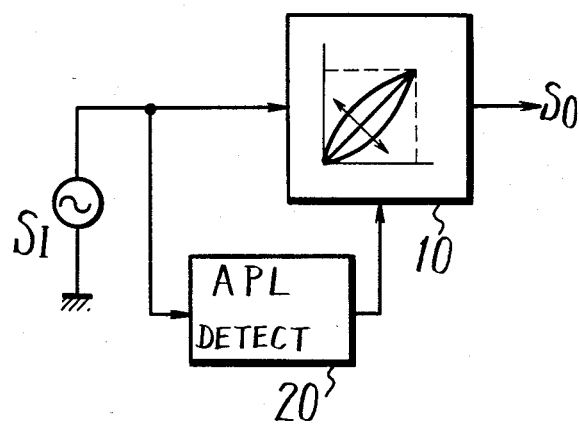
FIGS. 3 and 4 are diagrammatic views showing the basic construction of the circuit of this invention.

One embodiment showing the basic construction of a correction circuit according to this invention is illustrated in FIG. 3. A video input information signal Si is furnished to an input of a variable correction circuit 10 and is also furnished to an APL detecting circuit 20. The latter detects the APL of the input signal Si and provides a control signal to a control input of the variable correction circuit 10. The variable correction circuit 10 automatically adjusts its input-output characteristic in response to the control signal, and thus also, the input-output characteristic varies as a function of the detected APL. Consequently, the variable correction circuit provides an optimized output signal $S_O$.

Figure 4:
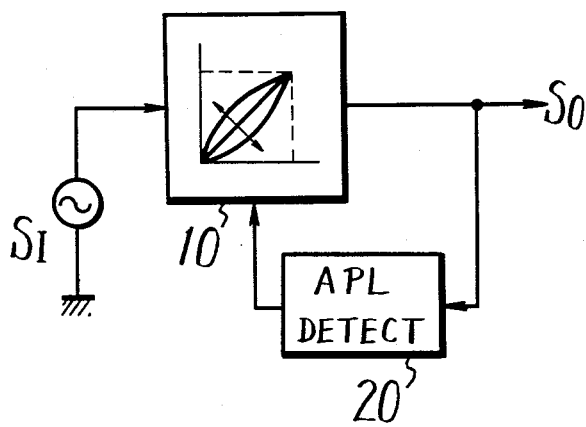

Another example of the control circuit of this invention is shown in FIG. 4, wherein the output signal $S_O$ is fed back to the APL detecting circuit 20, so that the input-output characteristic of the variable correction circuit 10 is determined in accordance with the average picture level of the output signal $S_O$.

The open-loop configuration of FIG. 3 has the advantage of fast and reliable response to changes in APL, while the closed-loop configuration of FIG. 4 has the advantage of superior accuracy in correcting the brightness characteristic of the video signal.

Figure 5:
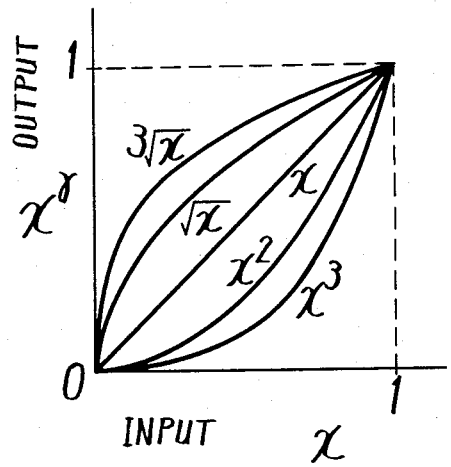
FIG. 5 is an input-output graph for explaining the present invention.

Practical input-output characteristics of the variable correction circuit are illustrated in FIG. 5, in which the absissa represents an input while the ordinate represents an output $X^\gamma$. Here, the input and output remain between values of "0" (representing the black level) and "1" (representing the peak white level). The value of $\gamma$ is changed according to the detected APL value. For example, when the APL is detected to be below 50%, $\gamma$ is selected as $\delta=\frac{1}{2}$, and the output becomes $\sqrt{X}$; when the detected APL is at 50%, $\gamma$ is selected as unity, and the output becomes X; and when the detected APL is above 50%, $\gamma$ is selected as $\gamma=2$, and the outout becomes $X^2$. For extreme values of the detected APL, $\gamma$ can be selected as $\gamma=\frac{1}{3}$ so that the output becomes $\sqrt[3]{X}$ when the detected APL is extremely low, and $\gamma=3$ so that the output becomes $X^3$ when the detected APL is extremely high.

Figure 6:
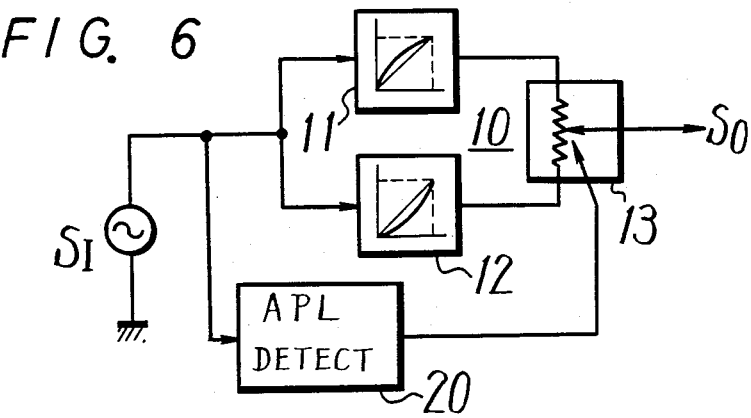
FIG. 6 is a systematic block diagram showing one embodiment of the correction circuit of this invention.
Figure 7:
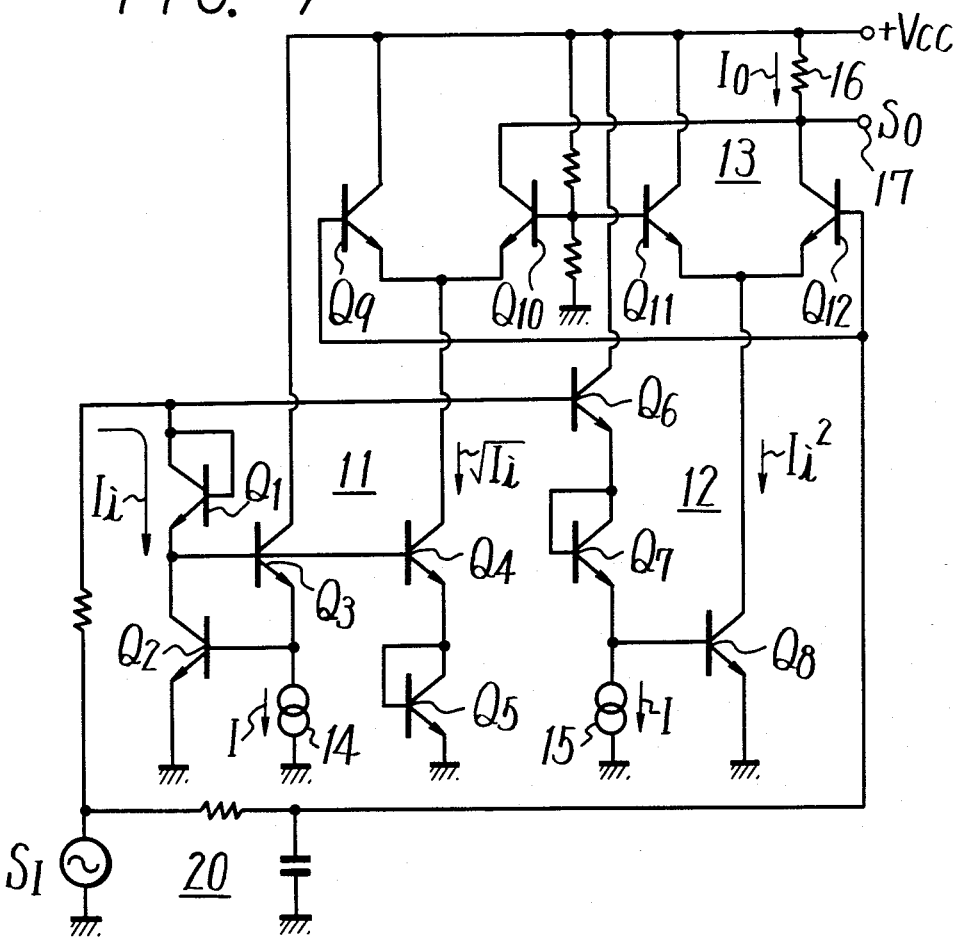
FIG. 7 is a detailed circuit diagram showing a practical example of the embodiment of FIG. 6.

A practical embodiment of the correction circuit of this invention is shown in FIG. 6, and the details thereof are illustrated in FIG. 7. In this embodiment, the variable correction circuit 10 is composed of a first correction circuit 11 having an input-output characteristic of $\gamma=\frac{1}{2}$ (i.e., a square-root circuit with an output $\sqrt{X}$), and a second correction circuit 12 having an input-output characteristic of $\gamma=2$ (i.e., a squaring circuit with an output $X^2$). When the input video signal $S_I$ is applied to respective inputs of each of the first and second correction circuits 11 and 12, the latter in turn provide first and second corrected video signals which are proportional to $\sqrt{X}$ and $X^2$, respectively. A summing circuit 13 combines the first and second corrected video signals in proportional amounts depending on the value of the control signal from the APL detector 20. Thus, when the APL is low, only the first corrected video signal $\sqrt{X}$ is provided. When the APL is high, only the second corrected video signal $\sqrt{X}$ is provided. When the APL is determined to be 50%, the first and second corrected video signals are provided in equal amounts so that the output signal $S_O$ has the output characteristic $$\frac{\sqrt{X} + X^2}{2},$$

that is, the output signal $S_O$ will be approximately the same as the input signal $S_I$. It should be noted that for $0 < X < 1$, the value of the expression $$\frac{\sqrt{X} + X^2}{2}$$

will be very close to the value $X(\gamma=1)$, and the two expressions will have the same value at 0, 1, and approximately 0.38.

In the practical circuit shown in FIG. 7, the first correction circuit 11 includes a constant current source 14; a diode-connected transistor $Q_1$, having its base and collector connected together to receive an input signal current $I_i$; an auxiliary transistor $Q_2$ having its collector coupled to the emitter of the transistor $Q_1$ and its emitter connected to ground; an input transistor $Q_3$ having its collector connected to a voltage source $V_{CC}$, its base connected to the emitter of the transistor $Q_1$, and its emitter coupled to the constant current source 14 and also to the base of the transistor $Q_2$; and an output transistor $Q_4$ having its base connected to the base of transistor $Q_3$ and the emitter of the transistor $Q_1$, and its collector providing the first output correction signal current $\sqrt{I_i}$. A diode-connected transistor $Q_5$ is connected between the emitter of the transistor $Q_4$ and ground.

The second correcting circuit 12 includes a constant current source 15, and input transistor $Q_6$ having its base connected to receive the input signal $S_I$ and its collector connected to the voltage source $V_{CC}$; a diode-connected transistor $Q_7$ having its base and collector connected to the emitter of the transistor $Q_6$ and its emitter connected to the constant current source 15; and an output transistor $Q_8$ having its base connected to the emitter of the transistor $Q_7$, its emitter connected to ground, and its collector providing a second output correction signal current $I_i^2$.

The summing circuit 13 is formed of a load resistor 16 connected to the voltage source $V_{CC}$; a first transistor $Q_9$ having its collector connected to the voltage $V_{CC}$ and its base connected to receive the control signal from the APL detecting circuit 20; a second transistor $Q_{10}$ having its collector connected to the load resistor 16 and its emitter, together with the emitter of the first transistor $Q_9$ connected to the collector of the output transistor $Q_4$. The summing circuit 13 also includes a third transistor $Q_{11}$ having its collector connected to the voltage source $V_{CC}$, and its base together with the base of the transistor $Q_{10}$ biased at a predetermined level. Also included is a fourth transistor $Q_{12}$ having its collector connected to the load resistor 16, its base connected to receive the control signal from the APL detecting circuit 20, and its emitter, together with the emitter of the third transistor $Q_{11}$ connected to the collector of the output transistor $Q_8$. An output terminal 17 is connected to the junction of the load resistor 16 with the collectors of the transistors $Q_{10}$ and $Q_{12}$.

In this embodiment, the APL detecting circuit 20 is a low-pass filter composed of a resistor and a capacitor.

The specific operation of the embodiment depicted in FIG. 7 is explained as follows:

In this circuit, if equal constant currents I are provided from each of the constant current sources 14 and 15, the base-emitter forward voltages of the transistors $Q_1$ to $Q_8$ are represented as $V_{BE1}$ to $V_{BE8}$, respectively, and the transistors $Q_1$ to $Q_8$ have respective collector currents $I_1$ to $I_8$, respectively, the following relationship is obtained:

$$V_{BE2} + V_{BE3} = V_{BE4} + V_{BE5} \qquad (1)$$

As is well known, the base-emitter forward voltage $V_{BE}$ of a transistor can be expressed as a function of its collector current $I_c$ and the saturation current $I_s$ thereof according to the following equation:

$$V_{BE} = KT/g \ln I_c/I_s \tag{2}$$

where g is an electric charge constant relating to the number of charge carriers in the base-emitter junction, K is the Boltzmann constant, and T is a constant having units of temperature. Accordingly, the currents of the transistors $Q_2$ to $Q_5$ will have the relationship $$I_2 \cdot I_3 = I_4 \cdot I_5 \tag{3}$$

In this circuit, $I_2$ is equal to the input current $I_i$, $I_3$ is equal to the current I of the constant current source 14, and $I_4$ is equal to $I_5$, so that the latter currents can be expressed as $I_4 = I_5 = I_m$. Accordingly, the following relationship results:

$$I_i \cdot I = I_m^2 \tag{4}$$

that is, $$I_m = \sqrt{I} \cdot \sqrt{I_i} \tag{5}$$

If it is assumed that the current I of the constant current source 14 is unity, then $I = 1$, and $$I_m = \sqrt{I_i} \tag{6}$$

Thus, the first correction circuit 11 has a gamma of ½.

At the same time, in the second correction circuit 13, the base-emitter voltages of the transistors $Q_6$, $Q_7$, and $Q_8$ can be expressed $$V_{BE1} + V_{BE3} + V_{BE2} = V_{BE6} + V_{BE7} + V_{BE8} \tag{7}$$

and the respective collector currents can be expressed as $$I_1 \cdot I_3 \cdot I_2 = I_6 \cdot I_7 \cdot I_8 \tag{8}$$

In addition, because the currents $I_1$ and $I_2$ are each equal to the input current $I_i$, and the currents $I_3$, $I_6$, and $I_7$ are each identical with the current I from the constant current source 15, if the current $I_8$ is expressed an $I_n$, the following relationship results:

$$I_i^2 \cdot I = I^2 \cdot I_n \tag{9}$$

or $$I_n = (1/I) \cdot I_i^2 \tag{10}$$

thus, if, as aforesaid, the current I is unity, then $$I_n = I_i^2 \tag{11}$$

Consequently, the second correction circuit 12 has a gamma of 2.

In the summing circuit 13, a current $k \cdot \sqrt{I_i}$ flows through the collector of the second transistor $Q_{10}$ while a current of $(1-k)I_i^2$ flows through the collector of the fourth transistor $Q_{12}$, where k is a positive number less than unity which is determined according to the average picture level voltage from the APL circuit 20. As a result, an output current $I_O$ flows through the load resistor 16, and can be expressed as follows:

$$I_0 = k\sqrt{I_i} + (1-k)I_i^2 \tag{12}$$

In other words, when the APL is detected to be extremely low, the transistors $Q_9$ and $Q_{12}$ are rendered nonconductive so that the constant k is unity, and the output current $I_O$ equals the current $\sqrt{I_i}$ from transistor $Q_4$. When the APL is approximately 50%, $k = \frac{1}{2}$, and the output current $I_O$ can be expressed.

$$I_0 = \frac{\sqrt{I_i} + I_i^2}{2}.$$

When the APL is determined to be high, the second and third transistors $Q_{10}$ and $Q_{11}$ are rendered nonconductive so that the constant $k = 0$ and $I_O$ can be expressed $$I_0 = \sqrt{I_i}.$$

Of course, for intermediate values of the detected APL, the constant k will take on intermediate values of gamma so that the output signal $S_O$ will provide a video picture of optimum contrast.

Figure 8:
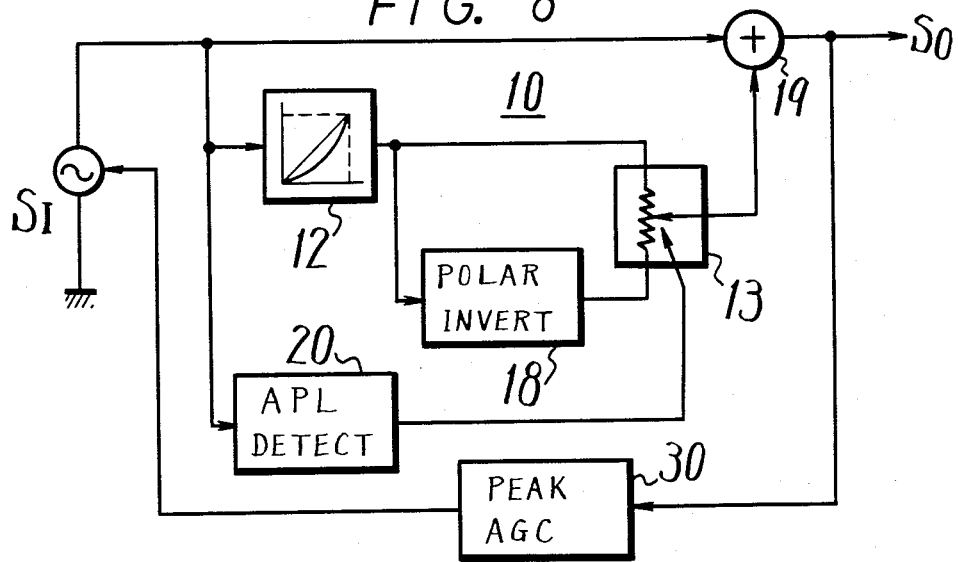
FIG. 8 is a systematic block diagram showing another embodiment of the circuit of this invention.

Another embodiment of the correction circuit according to this invention is illustrated in FIG. 8. In this embodiment, the variable correction circuit 10 is formed of the squaring circuit 12 having its input coupled to receive the input signal $S_i$, a polarity inverter 18 coupled to the output of the squaring circuit 12, and the summing circuit 13 connected to combine the output of the squaring circuit 12 with an inverted replica thereof provided from the polarity inverter 18. Also in this embodiment, an adder 19 is included to combine the input video signal with the resultant video signal provided from the summing circuit 13.

The summing ratio of the corrected signal from the squaring circuit 12 and the inverted replica thereof is changed according to the control signal furnished from the APL detector 20. Since the output of the polarity inverter 18 is expressed as $-X^2$, the output of the summing circuit 13 can be expressed as $$mX^2 - (1-m)X^2 = (2m-1)X^2$$

so that the output signal from the adder 19 can be expressed as $$X + (2m-1)X^2.$$

Hence, the input-output characteristic of the variable correction circuit 10 is changed according to the value of m in accordance with the detected average picture level. However, in order to maintain the brightness range of the output video signal $S_O$ as a constant, a peak automatic gain control circuit 30 is coupled from the output of the adder 19 back to a point in advance of the variable correcting circuit 10.

It should be noted that in this embodiment if the value of m is selected as ¼, the variable correction circuit 10 will have a gamma approximately ½, if the value of m is selected as ½, the gamma will be unity, and if the value of m is selected as 1, the gamma will be 2.

Figure 9:
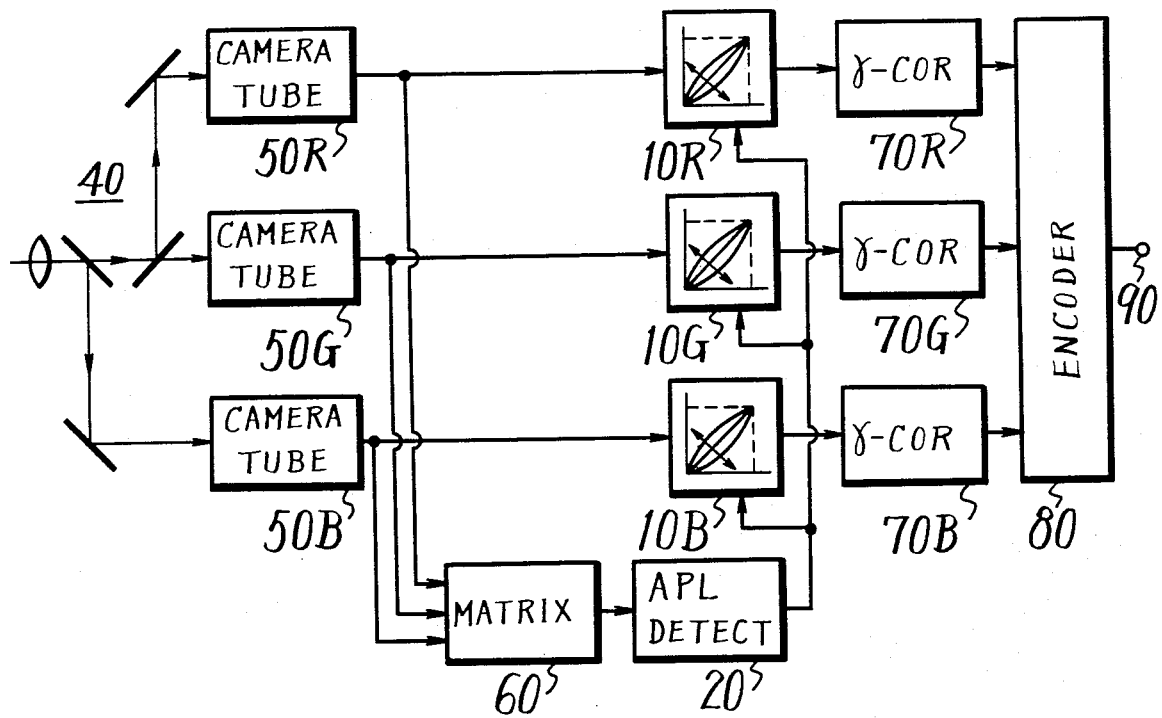
FIG. 9 is a systematic block diagram of a three-tube color television camera incorporating the present invention therein.

FIG. 9 illustrates a three-tube type color television camera incorporating a correction circuit according to the present invention. In this camera, an optical system 40 separates the image into red, green, and blue images which are incident on respective red, green, and blue image pickup tubes 50R, 50G, and 50B. As a result, the latter provide respective red, green, and blue color signals. These color signals are provided to a matrix circuit 60 which then derives from them a luminance signal and supplies the same to the APL detector 20. In this embodiment, respective variable correction circuits 10R, 10G, and 10B are provided to control the brightness of the corresponding red, green, and blue color signals. The control signal from the APL detector 20 is provided to each of the vertical correction circuits 10R, 10G, and 10B to control their respective input-output characteristics. Then, the corrected red, green, and blue color signals from the circuits 10R, 10G, and 10B are supplied through respective $\gamma$-correction circuits 70R, 70G, and 70B to an NTSC encoder 80, and the latter provides an encoded composite color video signal at an output terminal 90 thereof.

If instead of a plural-tube camera, a single-tube type color camera is employed, in which the luminance signal is separated, the average picture level of the luminance signal can be detected without the necessity of employing the matrix circuit 60.

Figure 10:
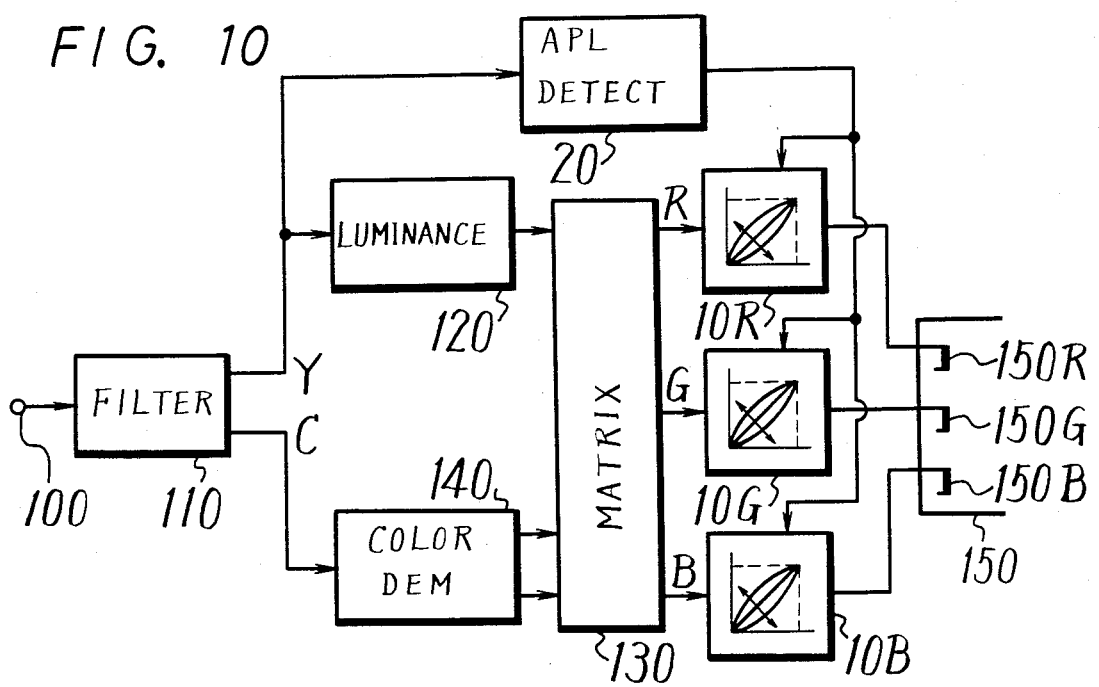
FIG. 10 is a systematic block diagram of a portion of a video display apparatus incorporating the present invention.

A television receiver incorporating a correction circuit according to this invention is illustrated in FIG. 10. In this receiver, a composite color video signal applied to an input terminal 100 thereof is separated in a filter circuit 110 into a luminance component Y and a chrominance component C. The luminance component Y is furnished through a luminance signal processing circuit 120 to a matrix circuit 130, and is also furnished to the APL detector 20. The chrominance component C is furnished to color demodulator 140 which then supplies a pair of color difference signals to the matrix circuit 130. The latter then provides primary color signals R, G, and B to a color cathode ray tube 150. In this receiver, respective variable correction circuits 10R, 10G, and 10B are provided between the matrix circuit 130 and respective cathodes 150R, 150G, and 150B of the color cathode ray tube 150. Here, the separated red, green, and blue color signals are adjusted in brightness according to the average luminance level detected by the APL detector 20.

Figure 11:
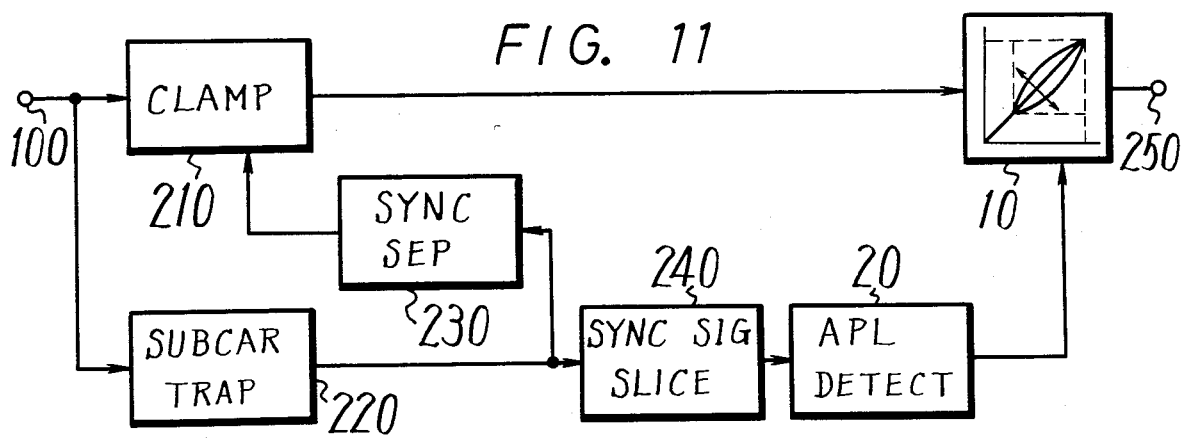
FIGS. 11 and 12 are systematic block diagrams of video signal processing circuits for use in video receivers and incorporating the present invention.

Another embodiment of this invention is illustrated in FIG. 11, in which the luminance component and the chrominance component are not separated, as they are in the embodiment of FIG. 10. In this embodiment, the composite color video signal is applied from the input terminal 100 to a clamp circuit 210 and thence to the variable correction circuit 10. The composite color video signal is also supplied to a subcarrier trap circuit 220, which blocks the chrominance component modulated on the subcarrier, so that only the luminance signal and the synchronizing pulse are passed. The synchronizing pulse is separated out therefrom in a synch separator 230 and is furnished to the clamp circuit 210 so that the latter can clamp the video signal to the pedestal level of the synchronizing pulse. The luminance component is furnished from the subcarrier trap 220 through a synch signal slice circuit 240 to the APL detector 20. A corrected composite color video signal is then applied from the variable correction circuit 10 to an output terminal 250. In this embodiment, the variable correction circuit 10 has an input-output characteristic that varies as a function of the control signal from the APL detector 20 during the line scanning portion of the video signal, but has a linear input-output characteristic ($\gamma = 1$) during the occurrence of the synchronizing pulse.

Figure 12:
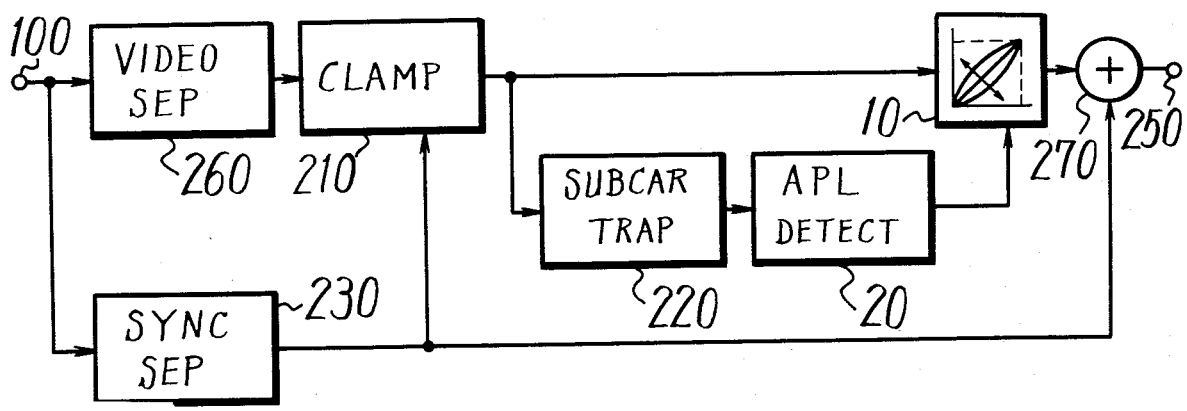

Another embodiment of the correction circuit of this invention is illustrated in FIG. 12. It should be appreciated that the embodiment of FIG. 12 is a variation of the embodiment of FIG. 11. In this embodiment, the luminance and chrominance components are not separated from one another, but the synchronizing pulse is separated out and is treated separately. Here, a video separator 260 is coupled to the input terminal 100 so that only the luminance and chrominance components are furnished to the clamp circuit 210. The synch separator 230 is coupled in advance of the video separator 260, and the separated synchronizing pulse is furnished therefrom to the clamp circuit 210 and also to an adder circuit 270 disposed after the variable correction circuit 10. The composite color video signal, without the synchronizing pulse, is applied to the clamp circuit 210 where it is clamped to the pedestal level of the synchronizing pulse from the synch separator 230, and the thus-clamped color video signal is supplied to the variable correction circuit 10. The clamped color video signal is also supplied through the subcarrier trap circuit 220 to the APL detector 20 which detects the average picture level of the luminance component. The APL detector 20 then furnishes a control signal to the variable correction circuit 10 to control its input-output characteristic. Then, the corrected color video signal from the variable correcting circuit 10 is combined in the adder circuit 270 with the separated synchronizing pulse, so that a finally corrected composite color video signal is provided at the output terminal 250.

Figure 13:
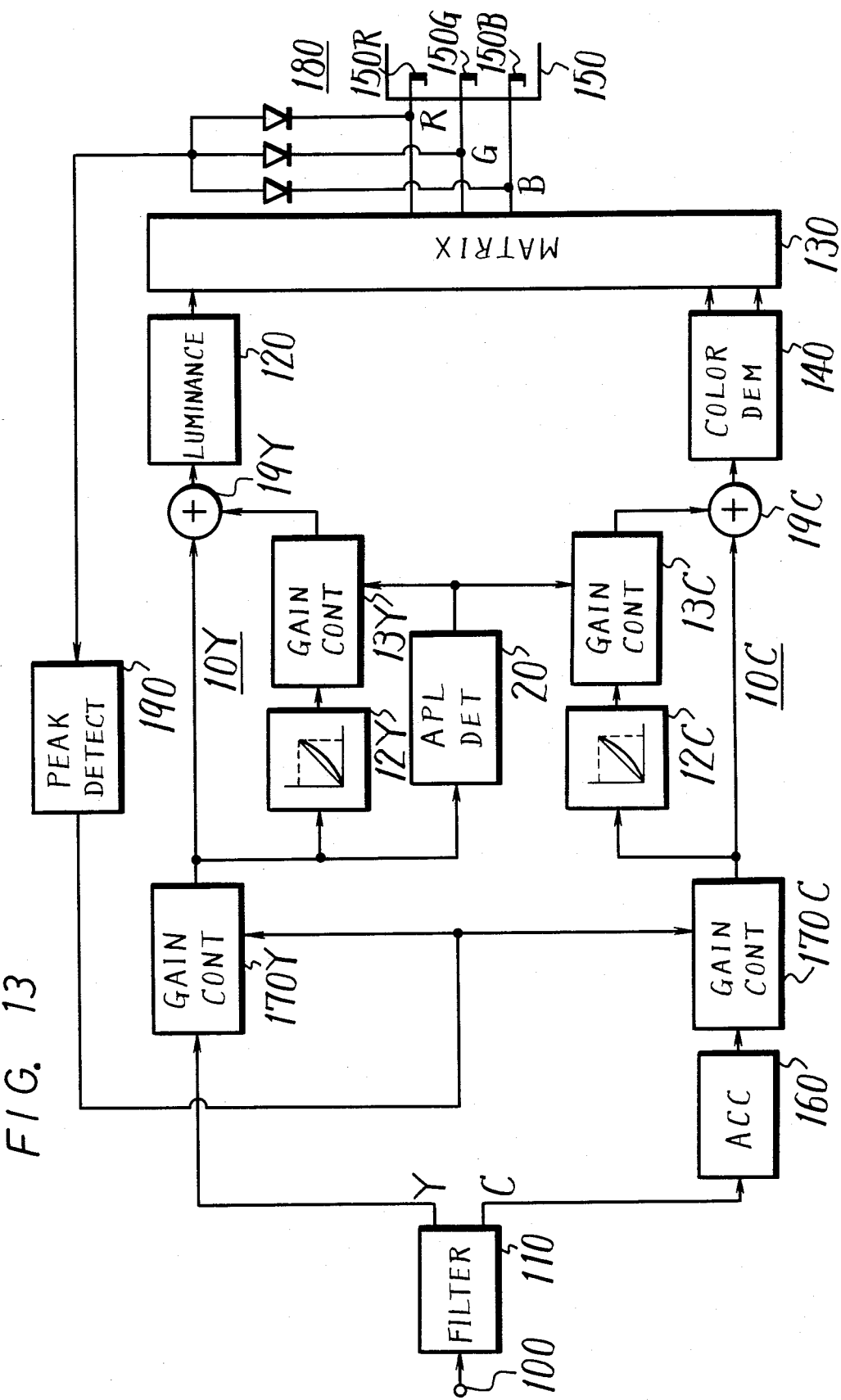
FIG. 13 is a systematic block diagram of a portion of a video receiver incorporating the present invention.

Yet another video receiver incorporating the correction circuit according to this invention is illustrated in FIG. 13. This video receiver combines the features of this invention with a circuit for dynamically controlling the amplitude of the video signal according to the picture contents, i.e., a so-called dynamic picture control circuit. Examples of such a dynamic picture control circuit are disclosed in U.S. Pat. No. 4,403,254, issued Sept. 6, 1983, and U.S. Pat. No. 4,298,885, issued Nov. 3, 1981, both of which have a common assignee herewith.

As illustrated in FIG. 13, the separated luminance signal is furnished from the filter 110 to a luminance gain control circuit 170Y and is then furnished to a luminance correction circuit 10Y. The latter is formed in general like the embodiment of FIG. 8, and includes a squaring circuit 12Y, a gain control circuit 13Y, and an adder circuit 19Y. A corrected luminance signal is furnished from the adder circuit 19Y through a luminance processing circuit 120 to the matrix circuit 130. The luminance component Y is also furnished from the gain control circuit 170Y to the APL detector 20 which then detects the average luminance component. The chrominance component C is furnished through an automatic chroma control (ACC) circuit 160 to a chrominance gain control circuit 170C, and thence to a chrominance correcting circuit 10C. This circuit 10C is basically similar to circuit 10Y and to the embodiment of FIG. 8, and includes a squaring circuit 12C, a gain control circuit 13C, and an adder circuit 19C. The corrected chrominance signal is then furnished from the adder circuit 19C to the color demodulator 140 which provides demodulated color difference signals to the matrix circuit 130.

The matrix circuit 130 provides decoded primary color signals R, G, and B to the cathodes 150R, 150G, and 150B and also to a minimum value detecting circuit 180, which here includes diodes having their cathodes connected to the cathodes 150R, 150G, and 150B of the cathode ray tube 150 and having their anodes connected to a peak detecting circuit 190. The output of the peak detecting circuit 190 then controls the gain of the gain control circuits 170Y and 170C.

In this embodiment, the control signal from the APL detector 20 is furnished to both the gain control circuit 13Y and the gain control circuit 13C of the respective luminance and chrominance variable correcting circuits 10Y and 10C.

In each of the above embodiments of this invention, the brightness of a video signal is automatically controlled according to the information carried within the video signal, thereby providing an optimum contrast ratio to that portion of the video picture having the greatest amount of information. As a result, according to this invention, it is possible to provide a reproduced picture which is natural and pleasing to the eye, and which has sufficient contrast so that the picture is neither harsh nor washed out.

Although certain preferred embodiments of this invention have been described in detail herein with reference to the accompanying drawings, it is to be understood that the invention is not limited to those precise embodiments, and that various changes and modifications may be effected therein by persons skilled in the art without departing from the scope or spirit of the invention as defined in the appended claims.

What is claimed is:

1. A control circuit for controlling the brightness of a video signal that fluctuates between a peak dark level and a peak bright level about an average brightness level comprising:

brightness controlling means having a signal input to which the video signal is applied as an input video signal and a signal output from which an output video signal is provided, said brightness controlling means being operable by a control signal for controlling the brightness of the video signal so that respective portions of said output video signal corresponding to portions of the input video signal at said peak dark level and at said peak bright level are provided substantially at said peak dark and bright levels while the average picture level of said output video signal is provided at a predetermined optimum level;

average picture level detecting means for detecting the average brightness level of at least one of said input and output video signals and providing said control signal in response to the detected average brightness level; and a variable gamma correction circuit included in said brightness controlling means and having an input-output characteristic such that for the input video signal having a level proportional to a value X, where X is in the range $0 \leq X \leq 1$, said video signal is provided at a level proportional to a value $X^\gamma$; and the value of $\gamma$ is automatically determined in response to the control signal from said average picture level detecting means.

2. A control circuit according to claim 1; wherein said average picture level detecting means is connected to receive said input video signal in advance of said brightness controlling means to provide said control signal as a function of the average brightness level of said input video signal.

3. A control circuit according to claim 1; wherein said average picture level detecting means is connected to receive said output video signal from said brightness controlling means to provide said control signal as a function of the average brightness level of said output video signal.

4. A correction circuit according to claim 1; wherein said variable gamma correction circuit includes means for selecting the value of $\gamma$ to be a number whose magnitude is less than unity when said average brightness level is detected to be less than said predetermined optimum level, to be unity when said average picture level is detected to be substantially at said predetermined optimum level, and to be a number greater than unity when said average brightness level is detected to be greater than said predetermined optimum level.

5. A control circuit according to claim 4; wherein the value of $\gamma$ is selected to be $\frac{1}{2}$ and 2, respectively when said average brightness level is detected to be less than and greater than said predetermined optimum level.

6. A control circuit for controlling the brightness of a video signal that fluctuates between a peak dark level and a peak bright level about an average brightness level comprising:

brightness controlling means having a signal input to which the video signal is applied as an input video signal having a level proportional to a value X, where X is in the range $0 \leq X \leq 1$, and a signal output from which an output video signal is provided, said brightness controlling means being operable by a control signal for controlling the brightness of the video signal so that respective portions of said output video signal corresponding to portions of the input video signal at said peak dark level and at said peak bright level are provided substantially at said peak dark and bright levels while the average picture level of said output video signal is provided at a predetermined optimum level; said brightness controlling means including first correction circuit means having an input-output characteristic such that a first corrected video signal is provided at a level proportional to $\sqrt{X}$, second correction circuit means having an input-output characteristic such that a second corrected video signal is provided at a level proportional to $X^2$ and summing circuit means for combining said first and second corrected video signals in relative amounts depending upon said control signal so that the combined first and second corrected video signals are provided as said output video signal; and average picture level detecting means for detecting the average brightness level of said input video signal and providing said control signal in response to the detected average brightness level.

7. A control circuit according to claim 6; wherein said first correction circuit means includes a constant current source, an input transistor having an input electrode coupled to receive said input video signal and an output electrode coupled to said constant current source, an auxiliary transistor having a control electrode coupled with the output electrode of the input transistor and current carrying electrodes respectively coupled to the control electrode of the input transistor and to a reference point; and an output transistor having a control electrode coupled to the control electrode of said input transistor and an output electrode providing said first corrected video signal.

8. A control circuit according to claim 7; wherein said first correction circuit means further includes a diode coupled in advance of the control electrode of said input transistor; and wherein said second correction circuit means includes a constant current source, an input transistor having a control electrode coupled to receive said input video signal and an output electrode, a diode having one electrode coupled to the output electrode of the input transistor and another electrode coupled to said constant current source, and an output transistor having a control electrode coupled to said other electrode of said diode and an output electrode providing said second corrected video signal.

9. A control circuit according to claim 6; wherein said summing circuit means includes a load impedance; a voltage source; a first transistor having a control electrode coupled to receive said control signal, one current-carrying electrode coupled to said voltage source, and another current-carrying electrode coupled to receive said first corrected video signal; a second transistor having a control electrode, an input electrode coupled to said another current-carrying electrode of said first transistor, and an output electrode coupled to said load impedance; a third transistor having a control electrode, one current-carrying electrode coupled to said voltage source and another current-carrying electrode coupled to receive said second corrected video signal; means biasing the control electrodes of said second and third transistors to a predetermined level; a fourth transistor having a control electrode coupled to receive said control signal, an input electrode coupled to said other current carrying electrode of said third transistor, and an output electrode coupled to said load impedance; and output means coupled to said output impedance to provide said output video signal.

10. A control circuit for controlling the brightness of a video signal that fluctuates between a peak dark level and a peak bright level about an average brightness level comprising:

brightness controlling means having a signal input to which the video signal is applied as an input video signal and a signal output from which an output video signal is provided, said brightness controlling means being operable by a control signal for controlling the brightness of the video signal so that respective portions of said output video signal corresponding to portions of the input video signal at said peak dark level and at said peak bright level are provided substantially at said peak dark and bright levels while the average picture level of said output video signal is provided at a predetermined optimum level; said brightness controlling means including correction circuit means having an input terminal to which said input video signal is applied and an output terminal at which a corrected video signal is obtained, the latter being substantially proportional to the square of the input video signal, polarity inverter means coupled to the output terminal of the correction circuit means for providing an inverted version of said corrected video signal, summing circuit means for combining said corrected video signal and the inverted version thereof in relative amounts depending upon said control signal to provide a resultant video signal and adder means for combining the input video signal with said resultant video signal to produce said output video signal; and average picture level detecting means for detecting the average brightness level of said input video signal and providing said control signal in response to the detected average brightness level.

11. A control circuit according to claim 10; further comprising peak automatic gain control circuit means for controlling the strength of the input video signal in response to at least one peak value of said output video signal.

12. A color television camera providing a composite color video signal comprising a plurality of pickup tubes each responsive to light of a respective primary color to produce a corresponding primary-color signal that fluctuates between a peak dark level and a peak bright level about an average brightness level; average picture level detecting means for detecting the average brightness level of the composite color video signal and providing a control signal in response to such detected average brightness level; a plurality of variable correction circuits each coupled to a respective pickup tube for processing a respective primary color signal, each such variable correction circuit being coupled to receive said control signal and having an input-output characteristic such that for the associated respective primary-color signal having a level proportional to a value X, where X is in range $0 \leq X \leq 1$, said variable correction circuit provides an output signal substantially proportional to a value $X^\gamma$, where the value $\gamma$ is automatically determined in response to the control signal from the average picture level detecting means; and encoding means coupled to receive the output signals from said variable correction circuits for providing said composite color video signal as a brightness-corrected composite color video signal.

13. A color television camera according to claim 12; wherein said composite color video signal includes a luminance component; and said average picture level detecting means includes a matrix circuit having inputs coupled to said plurality of pickup tubes and an output providing said luminance component, and also includes average luminance level detecting means coupled to said matrix circuit and responsive to said luminance component for providing said control signal.

14. A control circuit for controlling the brightness of a video signal in a color television display apparatus having a color display tube providing a color video picture in response to a plurality of primary color signals, and in which a chrominance signal and a luminance signal that varies between a black level and a peak white level about an average brightness level are combined to form said plurality of primary color signals, comprising average picture level detecting means coupled to receive the luminance signal for detecting the average brightness level of said luminance signal and providing a control signal in response to the detected average brightness level; and a plurality of variable correction circuits each operative upon a respective primary color signal and disposed in advance of said color display tube, each such variable correction circuit being coupled to receive said control signal and having an input-output characteristic such that for the associated respective primary-color signal having a level proportional to a value X, where X is in the range $0 \leq X \leq 1$, said variable correction circuit provides to the associated respective beam-generating device, an output signal that is substantially proportional to a value $X^\gamma$, where the value of $\gamma$ is automatically determined in response to said control signal.

15. A correction circuit for controlling the brightness of a composite color video signal having a luminance component that fluctuates between a black level and a peak white level about an average luminance level, a chrominance component, and a synchronizing pulse with a pedestal portion, comprising clamping means for establishing the black level of said video signal as a function of said pedestal portion; means for providing said synchronizing pulse to said clamping means; average picture level detecting means for providing a control signal in response to the average luminance level of said luminance component; and brightness controlling means coupled to receive said control signal and having a signal input to which at least said luminance and chrominance components are applied and a signal output from which an output composite video signal is obtained, for controlling the brightness of the composite video signal so that respective portions of said output composite video signal corresponding to portions of the luminance component at said black level and at said peak white level are provided substantially at said black and peak white levels, while said output composite video signal has an average picture level that is provided at a predetermined optimum level.

16. A correction circuit according to claim 15; wherein said brightness controlling means has an input-output characteristic that varies as a function of said control signal between occurrences of said synchronizing pulse but has a constant input-output charcteristic during occurrence of said synchronizing pulse.

17. A correction circuit according to claim 16; further comprising synch signal slicing means in advance of said average picture level detecting means for blocking said synchronizing pulse.

18. A correction circuit according to claim 15; further comprising separating means in advance of said clamping means for passing thereto said composite color video signal without said synchronizing pulse, said means for providing said synchronizing pulse having an input coupled in advance of said separating means; and wherein said brightness controlling means includes means for controlling the brightness of the clamped luminance and chrominance components to provide a corrected signal and adder means for combining the corrected signal with the synchronizing pulse to produce said output composite video signal.

19. A color video display apparatus to which is applied a composite color video signal including a chrominance component and a luminance component that fluctuates between a black level and a peak white level about an average brightness level comprising separating means for separating said luminance component and said chrominance component from said composite color video signal; average picture level detecting means having an input coupled to receive the separated luminance component for providing a control signal in response to the detected average brightness level; variable luminance component controlling circuit means having an input to receive the separated luminance component, a signal output from which a corrected luminance component is provided, and a control input to receive said control signal, for controlling the brightness of the separated luminance component so that respective portions of the corrected luminance component corresponding to portions of the separated luminance component at said black and peak white levels are provided substantially at said black and peak white levels, while the average brightness level of said corrected luminance component is provided substantially at a predetermined optimum level; variable chrominance component controlling circuit means having an input to receive the separated chrominance component, a signal output from which a corrected chrominance component is provided, and a control input to receive said control signal, for controlling the strength of the separated chrominance component, and having an input-output characteristic that varies as a function of said control signal; processing circuit means to which said corrected luminance and chrominance components are applied for producing a plurality color signals; and display means for producing a picture in response to said primary color signals.

20. A color video display apparatus according to claim 19; further comprising minimum value detecting means for detecting the minimum among the levels of said plurality of primary color signals; peak detecting means for detecting the peak value of such detected minimum level and providing a gain control signal in response thereto; luminance gain control means interposed between said separating means and said variable luminance component controlling circuit means for controlling the strength of said separated luminance component in dependence on said gain control signal; and chrominance gain control means interposed between said separating means and said variable chrominance component controlling means for controlling the strength of said separated chrominance component in dependence on said gain control signal.

21. A color video display apparatus according to claim 20; further comprising an automatic chroma control circuit interposed between said separating means and said chrominance gain control means.

* * * * *